(12) United States Patent
Hart (10) Patent No.: US 9,390,563 B2
(45) Date of Patent: Jul. 12, 2016

(54) AUGMENTED REALITY DEVICE

(71) Applicant: Airvirtise LLC, Dallas, TX (US)

(72) Inventor: Kevin J. Hart, Coppell, TX (US)

(73) Assignee: AIR VIRTISE LLC, Dallas, TX (US)

( * ) Notice: Subject to any disclaimer, the term of this patent is extended or adjusted under 35 U.S.C. 154(b) by 0 days.

(21) Appl. No.: 14/457,312

(22) Filed: Aug. 12, 2014

(65) Prior Publication Data

US 2015/0042681 A1   Feb. 12, 2015

(51) Int. Cl.
*G06T 19/00* (2011.01)
*G06Q 30/02* (2012.01)
*G06Q 10/08* (2012.01)
*G06Q 20/36* (2012.01)
*G06Q 30/06* (2012.01)

(52) U.S. Cl.
CPC ............ *G06T 19/006* (2013.01); *G06Q 10/083* (2013.01); *G06Q 20/36* (2013.01); *G06Q 30/0242* (2013.01); *G06Q 30/0261* (2013.01); *G06Q 30/0633* (2013.01); *G06Q 30/0641* (2013.01); *G06Q 30/0643* (2013.01); *G06T 2215/16* (2013.01)

(58) Field of Classification Search
CPC ..................................................... G06T 19/006
USPC .................................................. 345/629–633
See application file for complete search history.

(56) References Cited

U.S. PATENT DOCUMENTS

| 5,856,844 | A | 1/1999 | Batterman et al. |
| 6,057,856 | A * | 5/2000 | Miyashita ............... G06T 15/00 345/633 |
| 6,625,299 | B1 | 9/2003 | Meisner et al. |
| 7,190,331 | B2 | 3/2007 | Genc et al. |
| 7,215,322 | B2 | 5/2007 | Genc et al. |
| 7,801,328 | B2 | 9/2010 | Au et al. |
| 7,849,421 | B2 | 12/2010 | Yoo et al. |
| 7,898,504 | B2 | 3/2011 | Fischer |
| 7,920,071 | B2 | 4/2011 | Baillot |
| 8,094,090 | B2 | 1/2012 | Fisher et al. |
| 8,102,334 | B2 | 1/2012 | Brown et al. |
| 8,217,856 | B1 | 7/2012 | Petrou |
| 8,644,673 | B2 | 2/2014 | Martin et al. |
| 9,020,838 | B2 * | 4/2015 | Herwig ............. G06Q 30/0623 345/633 |
| 2003/0210228 | A1 | 11/2003 | Ebersole et al. |
| 2010/0004995 | A1 * | 1/2010 | Hickman ............... G06Q 30/02 705/14.58 |
| 2010/0023878 | A1 * | 1/2010 | Douris ................ H04L 12/6418 715/757 |

(Continued)

FOREIGN PATENT DOCUMENTS

WO   WO-2015023630 A1   2/2015

OTHER PUBLICATIONS

PCT/US2014/050637 International Preliminary Report on Patentability dated Feb. 25, 2016.

(Continued)

*Primary Examiner* — Jacinta M Crawford
*Assistant Examiner* — Phong Nguyen
(74) *Attorney, Agent, or Firm* — Wilson, Sonsini, Goodrich & Rosati (57) ABSTRACT

An augmented reality device may consist of at least a controller, memory, and at least one screen. The augmented reality device can be configured to display an augmented reality digital content via the at least one screen with the augmented reality digital content positioned at a physical location and displayed only when a user is oriented towards the physical location.

21 Claims, 6 Drawing Sheets

(56) References Cited

U.S. PATENT DOCUMENTS

| | | | | |
|---|---|---|---|---|
| 2010/0156933 A1* | 6/2010 | Jones | ................. | G06Q 30/02 345/629 |
| 2011/0090252 A1 | 4/2011 | Yoon et al. | | |
| 2012/0019557 A1 | 1/2012 | Aronsson et al. | | |
| 2012/0075343 A1 | 3/2012 | Chen et al. | | |
| 2012/0113141 A1 | 5/2012 | Zimmerman et al. | | |
| 2012/0212406 A1* | 8/2012 | Osterhout | ............. | G02B 27/017 345/156 |
| 2012/0218296 A1* | 8/2012 | Belimpasakis | ......... | G06T 17/05 345/633 |
| 2012/0293547 A1* | 11/2012 | Bai | ................. | G06Q 30/0261 345/633 |
| 2012/0299950 A1* | 11/2012 | Ali | .................... | G02B 27/0176 345/592 |
| 2012/0327112 A1* | 12/2012 | Aldunate | ................ | H04L 67/36 345/629 |
| 2013/0088516 A1* | 4/2013 | Ota | ....................... | G06T 11/00 345/633 |
| 2013/0187951 A1* | 7/2013 | Suzuki | .......................... | 345/633 |
| 2013/0187952 A1 | 7/2013 | Berkovich et al. | | |
| 2013/0321461 A1* | 12/2013 | Filip | ...................... | G06F 3/011 345/632 |
| 2014/0004885 A1* | 1/2014 | Demaine | ................. | G06F 3/016 455/456.3 |
| 2014/0015851 A1* | 1/2014 | Licata | ...................... | G06F 3/14 345/611 |
| 2014/0313225 A1* | 10/2014 | Lee | ....................... | G06T 19/006 345/633 |
| 2015/0046252 A1 | 2/2015 | Hart | | |
| 2015/0046284 A1 | 2/2015 | Hart | | |
| 2015/0046295 A1 | 2/2015 | Hart | | |
| 2015/0046296 A1 | 2/2015 | Hart | | |
| 2015/0178257 A1* | 6/2015 | Jones | ................... | G06F 17/241 345/419 |

OTHER PUBLICATIONS

PCT/US2014/050637 International Search Report and Written Opinion dated Nov. 25, 2014.

* cited by examiner

AUGMENTED REALITY DEVICE

RELATED APPLICATIONS

This application makes a claim of domestic priority under 35 U.S.C. §119(e) to U.S. Provisional Patent Application No. 61/864,850 filed Aug. 12, 2013.

SUMMARY

Assorted embodiments configure an augmented reality device with at least a controller, memory, and at least one screen. The augmented reality device can be configured to display an augmented reality digital content via the at least one screen with the augmented reality digital content positioned at a physical location and displayed only when a user is oriented towards the physical location.

DETAILED DESCRIPTION

The current disclosure generally relates to an augmented reality system that is capable of anchoring digital content to digital airspace having a particular latitude, longitude, and altitude. The system may further have an augmented reality device that may access the digital content and digital airspace in various embodiments without limiting the scope of those or other possible embodiments.

Progression of computing systems and peripheral devices that utilize computing technology towards faster operation, greater capabilities, and smaller form factors has allowed exclusively digital realities to be rendered. Advancement of digital reality creation and control software past gaming consoles and desktop computers has been complemented by mobile computing systems like smart phones, tablets, and wireless computing devices such as wearable glasses and interactive glass that can utilize positioning awareness to provide a digital reality nearly anywhere in the world.

As mobile computing systems become increasingly ingrained into the everyday items consumers use, the opportunity exists for an augmented reality to utilize a combination of real world locations with the creation and control of digital content. While computing devices capable of correlating actual physical locations with a digital reality are theoretically possible, the organization and content of the augmented reality has not been developed. Hence, a mobile computing device that can provide access to both an augmented reality as well as the content and organization of the digital space is a continued industry direction that is focused on ideally delivering a seamless combination of physical and augmented realities via an augmented reality device.

Currently, small mobile computing devices are being developed to fit to a user so that the physical world and computer-generated content can be concurrently viewed. However, the utilization of such simultaneous viewing has been limited to a display that is controlled via articulation of buttons and controls on the computing device or through a peripheral remote. While movement of a user's eye has been used to control computing environments in the past, restriction of an augmented reality to control via eye movements hinders the scope and use of the digital content of the augmented reality. Thusly, it is the object of the present disclosure to provide a device that allows physical engagement with an augmented reality to optimize the potential of digital content correlated with a real-world physical location.

With such issues in mind, an augmented reality device may have at least a controller, memory, and at least one screen and configured to display an augmented reality digital content via the at least one screen with the augmented reality digital content positioned at a physical location and displayed only when a user is oriented towards the physical location. Interaction with the augmented reality digital content can be facilitated by an interaction circuit of the augmented reality device that can recognize a user's physical engagement with the physical location through the user's appendage or through a designated article, such as a ball, club, stylus, and projectile.

The ability to recognize and log physical interactions with digital airspace allows a diverse variety of digital content to provide consumer, financial, directional, informational, emergency, entertainment, and educational subject matter without erecting physical signage and video playback equipment that can clog physically tight and highly trafficked real-world locations. Additionally, the recognition and logging of physical interactions with digital airspace at a specific physical location can provide a physical presence to exclusively digital sources, such as eCommerce websites, advertising, digital applications, and databases.

Figure 1:
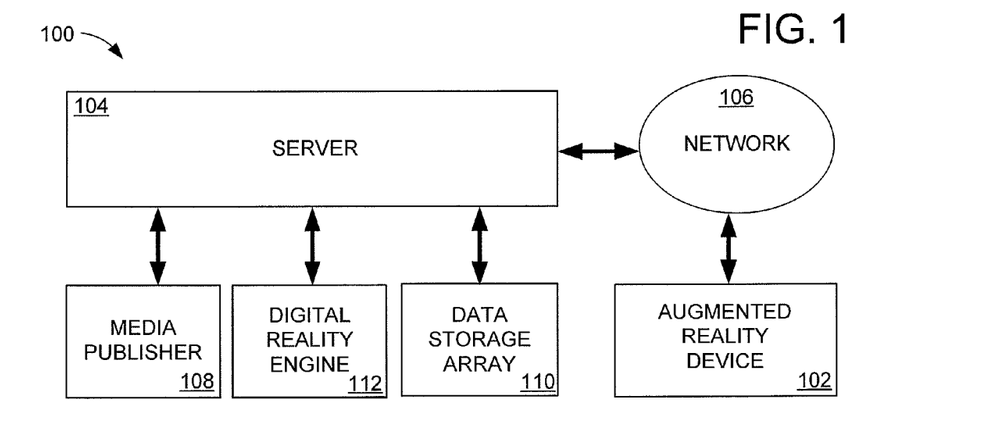
FIG. 1 is a block representation of a portion of an example computing system configured and operated in accordance with some embodiments.

While the computing environment in which an augmented reality device can be practiced is not limited, FIG. 1 generally illustrates an example computing environment 100 that can utilize an augmented reality device 102 in accordance with various embodiments. The augmented reality device 102 may be configured to be any size, capacity, and computing speed that can conduct stand-alone computing operations, like taking pictures, as well as network operations, like accessing a remote server 104, over a wired or wireless network 106 via appropriate protocol. The content of the network 106 is unlimited and may comprise at least media content from a publisher 108, remote data storage via a data storage array 110, and digital reality engine 112 that respectively communicate over the network 106 directly and through the server 104.

Through utilization of network 106 content, the augmented reality device 102 can send and receive data that allows vast information to be accessed, viewed, and engaged by a user of the device 102. For instance, signing into a digital location via the augmented reality device 102 can commence a retrieval of data from multiple remote sources across the network 106 to return news, mail, social media, and secure documents. The ability of the augmented reality device 102 to correlate actual, physical locations on the globe with digital content can further allow for the production of a digital environment and digital content assigned to that particular physical location.

Figure 2:
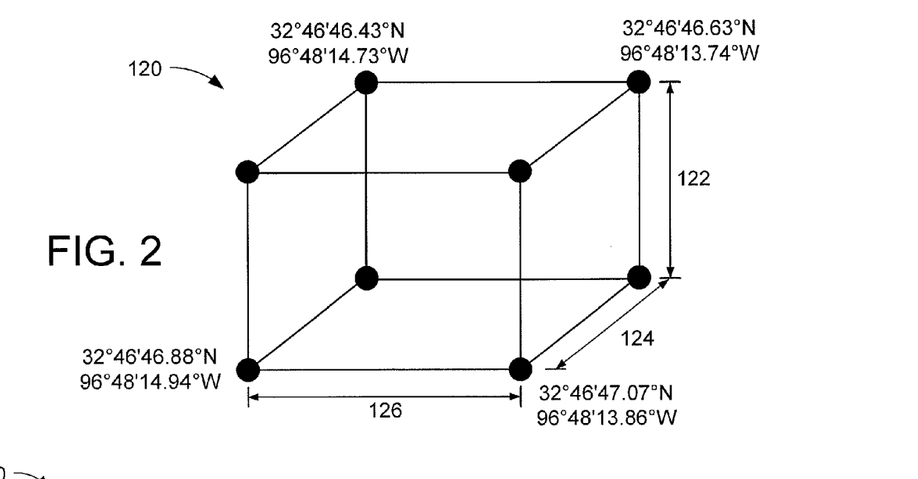
FIG. 2 shows a block representation of an example augmented reality digital airspace that may be utilized by the computing system of FIG. 1.

FIG. 2 coveys a block representation of an example augmented reality digital airspace 120 in which various amounts and types of augmented reality digital content can be displayed, engaged, and utilized to compute real and predicted metrics. The digital airspace 120 has a volume and is anchored at a set of coordinates that correspond with a physical location on the Earth. While the digital airspace 120 can be any size and position in the world, the non-limiting embodiment shown in FIG. 2 has eight unique coordinates of longitude, latitude, and altitude that define the airspace's 120 height 122, length 124, and width 126. It is contemplated that the digital airspace 120 is configured to be any shape, such as a cone, trapezoid, sphere, parallelogram, and spheroid, which are defined by any number of unique coordinates.

Figure 3:
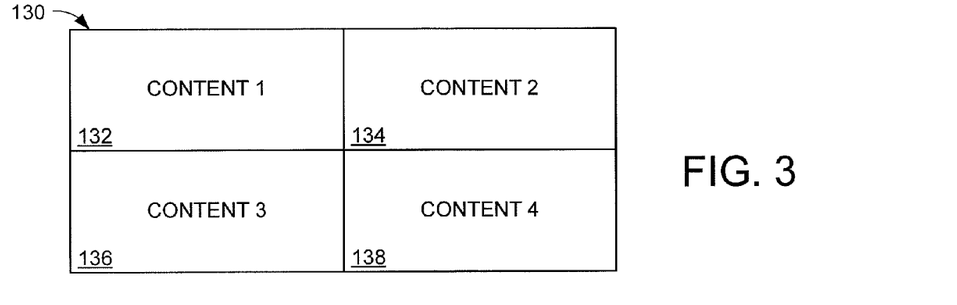
FIG. 3 depicts a block representation of an example augmented reality digital airspace configured in accordance with assorted embodiments.

FIG. 3 provides a front view block representation of an example augmented reality digital airspace 130 that can be generated and altered by an augmented reality device in accordance with assorted embodiments. The digital airspace 130 can be defined by multiple unique coordinates each comprising a longitude, latitude, and altitude that combine to form a set of coordinates. The digital airspace 130, as shown, but in no way limiting, can be divided into sub-sections that can individually and collectively display digital content, such as advertising, information, video, applications, and combinations thereof, which is anchored to the set of coordinates and visible to a user when the user is oriented towards the physical location defined by the set of coordinates. That is, the digital content is positioned in the physical location regardless of the position and orientation of the user.

For example, a first sub-section 132 can display a static two-dimensional or three-dimensional image concurrently while a second sub-section 134 displays a dynamic image, such as a video or interactive application when a user is facing the physical location defined by unique sets of longitude, latitude, and altitude. It is contemplated that third 136 and fourth 138 sub-sections are left blank until the augmented reality device queues content, such as static or dynamic images, to the respective sub-sections 136 and 138. In some embodiments, the digital content is resized with a common or dissimilar aspect ratio to accommodate the addition or subtraction of a sub-section from the digital airspace 130. Other embodiments can position the different digital content facing different directions. For instance, the first sub-section 132 may face downward while the second sub-section 134 faces a first lateral direction and the third sub-section 136 faces a second lateral direction that is angled 30° to the first lateral direction.

In some embodiments, the digital content is resized with a common or dissimilar aspect ratio to accommodate the addition or subtraction of a sub-section from the digital airspace 130. Other embodiments can position the different digital content facing different directions. For instance, the first sub-section 132 may face downward while the second sub-section 134 faces a first lateral direction and the third sub-section 136 faces a second lateral direction that is angled 30° to the first lateral direction.

Figure 4:
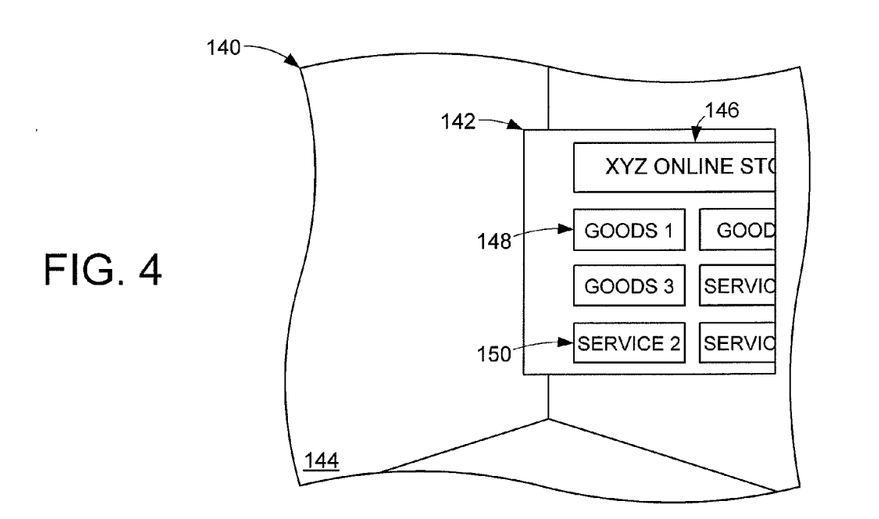
FIG. 4 illustrates a perspective block representation of an example augmented reality system constructed and operated in accordance with some embodiments.

FIG. 4 is a perspective view block representation of an example augmented reality environment 140 capable of being produced and controlled by the augmented reality device 102 of FIG. 1. The perspective view of FIG. 2 shows how a screen 142 of an augmented reality device can be worn, handled, or presented in front of a user to concurrently provide digital content within the screen 142 and a view of actual, physical space 144 both beyond and around the objects on the screen 142. It is contemplated that the augmented reality device can be worn by being physically attached to person, such as via a belt or clip onto glasses, or by being handled by the user, such as via looking through a mobile computing device like a smartphone or laptop.

In some embodiments, the augmented reality device functions in concert with a remote server to establish the physical space 144 being viewed by a user, the digital airspace corresponding to some or all of the physical space 144, and the digital content to be shown on the screen 142. Such communication with a remote server allows the augmented reality device to be small in size and computing power as the remote server computes and provides the digital content to be displayed on the screen 142.

It should be noted that the size and scope of the digital content on the screen 142 is not limited to a particular portion of a user's field of vision as the digital content may extend throughout the user's field of vision or be sectioned to predetermined viewing dimensions. The screen 142 may alternatively be sized and fit to a user so that the digital content does not obscure all the user's field of vision, such as covering some of one of the user's eyes while leaving the remaining eye open to view the physical space 144. The digital content displayed on the screen 142 can be anchored to a particular volume of airspace corresponding to a physical location. The augmented reality device can display some, or all, of the digital content relative the orientation of the user or screen to the physical location. That is, if a user is oriented towards the physical location, the digital content is displayed, but gradually removed as the user moves to become oriented so that the physical location is not aligned with the user and the screen due to the digital content being invisible to the naked eye.

Although the digital content displayed on the screen 142 is not limited to a particular size or position, various embodiments configure the augmented reality device with the capability to render digital content as a variety of different types of media, such as two-dimensional images, three-dimensional images, video, text, executable applications, and customized combinations of the like. Regardless of the type of digital content, the correlation of a physical space 144 with digital airspace in an augmented reality allows for certain digital content to be tied to a particular location on the globe. As shown in FIG. 4, an online store can be correlated by the augmented reality device to a longitude, latitude, altitude, and time of the physical space 144 and provide at least signage 146, goods 148, and services 150 that can be engaged, viewed, and accessed through a variety of different manners.

Assorted embodiments can configure the digital content displayed on the screen 142 to be engaged through physical interaction with some aspect of a user. That is, the goods 148 and services 150 can appear on the screen 142 and be engaged by the user to trigger a plethora of different activation results. As a non-limiting example, the physical touching of the physical space 144 assigned to goods 1 can activate further information to appear in the digital airspace, the purchase of the goods 1 identified in the digital airspace, and removal of the goods 1 icon from the screen 142. In other words, the augmented reality device can be configured to correlate digital content displayed on a screen or projected into space with a physical location and subsequently recognize the physical interaction of a user with that digital content to produce a predetermined activation result.

Figure 5:
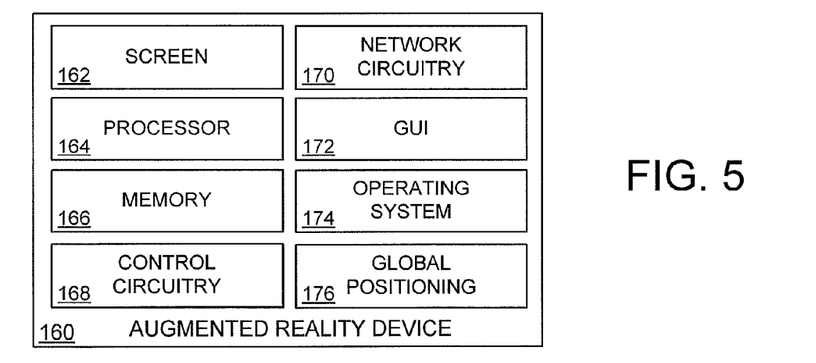
FIG. 5 provides a block representation of an example augmented reality device configured in accordance with various embodiments.

FIG. 5 is a block representation of an example augmented reality device 160 constructed and operated in accordance with some embodiments to provide digital content in manners similar to that shown in FIG. 4. The augmented reality device 160 is not limited to the configuration or constituent components shown in FIG. 5, but can correlate real-world physical locations with digital content with at least the components displayed in FIG. 5. At least one screen 162 can take data from one or more processors 164 and data storage memories 166 to compute, organize, and render visual digital content in a predetermined manner, such as 2D, 3D, interactive, and video.

Each processor 164 and data storage memory 166 can further cooperate with control 168 and network 170 circuitries to recognize a user's physical interaction with the digital content on the screen 162 that is associated with a particular latitude, longitude, altitude, and time and communicate the interaction across a network, such as network 106 of FIG. 1. The digital content rendered on each screen 162 can be complemented by a graphical user interface (GUI) 172 that functions to control an operating system 174 to provide the user with options and interface with how and what the augmented reality device 160 is operating. The operating system 174, processor 164, memory 166, and network circuitry 170 may access and utilize a global positioning 176 aspect of the device 170 to indicate the position of the device 160 and of digital content being engaged in digital airspace.

In various embodiments, the network 170 and/or global positioning 176 circuitry consists of one or more Bluetooth or global positioning adapters that continuously, sporadically, routinely, and randomly send local and remote signals to understand where the augmented reality device 160 is. The global positioning adapter may have a secured connection and may utilize triangulated satellite signals to allow the processor 164 to generate augmented reality digital content accurately at a predetermined physical location.

Figure 6:
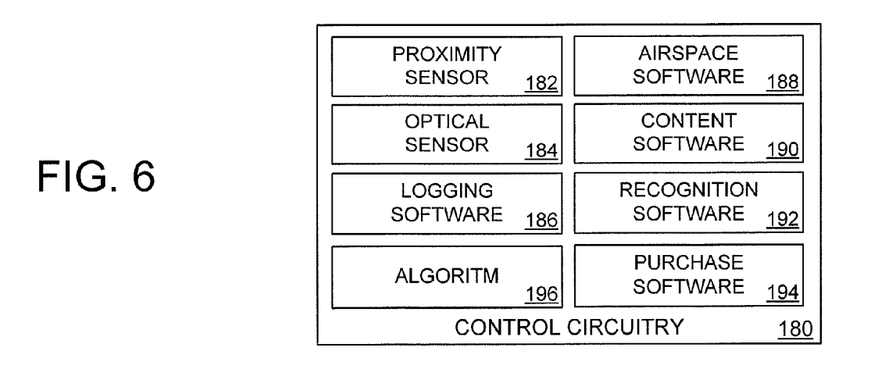
FIG. 6 is a block representation of a portion of an example augmented reality device arranged in accordance with assorted embodiments.

While the augmented reality device 160 may have more, or less, constituent components that provide any number of device 160 capabilities, several components may operate individually, concurrently, and sequentially with various aspects of the control circuitry 168 to provide specific device 160 functions. FIG. 6 is a block representation of an example control circuitry 180 capable of being used in the augmented reality device 160 of FIG. 5 in assorted embodiments. Much like the variety and number of different constituent components that are not required or limiting in FIG. 5, the control circuitry 180 can be configured with a wide array of different hardware and software components that can be accessed and utilized independently and simultaneously to provide various augmented reality device capabilities.

As shown, the control circuitry 180 can comprise any number of different sensors, such as the proximity 182 and optical 184 sensors like a laser or Bluetooth beacon, that function to provide the logging 186, airspace 188, content 190, recognition 192, and purchase software 194 with device and user conditions. For example, the sensors 182 and 184, as well as an unlimited variety of other sensing equipment, can detect and return data to a processor and memory of the augmented reality device so that various software applications can utilize the data to provide diverse device capabilities. The logging software 186 can take data at least from the sensors 182 and 184 to register a plethora of device and user activity, such as, but not limited to, the movement of the device relative to a predetermined area and user interaction with digital content in a digital airspace.

The logging software 186 can operate alone and in conjunction with the airspace software 188 to determine the amount of time and type of interaction being conducted on the digital content in the digital airspace. The digital airspace can be continually, sporadically, and routinely monitored by the airspace software 188 to ensure the digital content is appropriate and properly positioned relative to the user. That is, the airspace software 188 can maintain digital content in the proper space within the digital airspace, such as height above the ground and orientation with respect to proximal walls. The airspace software 188 may comprise digital content rendering algorithms that allow the digital airspace to be illustrated on one or more device screens.

The content software 190 can likewise be configured with visual content rendering capabilities as well as the ability to take data from remote sources, such as a server across a network, to update, change, and remove digital content from the digital airspace. With the content software 190 handling the generation of digital content in cooperation with the airspace software 188, the digital content can seamlessly appear in a predetermined digital airspace despite a user moving relative to the airspace. In other words, the digital content can be configured to appear stationary or pointing towards a user regardless of the user's position relative to the digital airspace due to the airspace 188 and content 190 software concurrently working to render and position the digital content in appropriate locations within the digital airspace.

Configuring the device with recognition software 192 can further expand the responsibilities of the airspace 188 and content 190 software as the digital content is adapted to interaction with recognized physical actions from the user. As a non-limiting example, a user reaching towards a physical location in the digital airspace can be recognized by the recognition software 192 and correspond with the digital content changing visually and spatially in response to the user's action. As such, the digital content can adapt and respond to the actions of at least one user to provide comprehensive and interactive media content that is especially effective for advertising, educational, and commercial digital content.

It is noted that the content software 190 can anchor augmented reality digital content based on the longitude, latitude, and altitudes coordinates that may be purchased by third parties, such as individuals, corporations, organizations, and governments. The size of the digital airspace, which corresponds to any number of coordinates that are purchased, can provide one or more different types of digital content. In some embodiments, the control circuitry 180 can generate a coupon, token, or voucher to a user's mobile device upon the recognition software 192 sensing user's engagement with the digital airspace. The content software 190 may assign augmented reality digital content to two sets of coordinates, such as for two dimensional content, or four sets of coordinates, such as for three dimensional content.

Through coordinate based digital content placement methodology applied by the control circuitry 180 allows for augmented reality to coincide with our existing reality by understanding the content's coordinates proximity to other structures and the user. For example, if a structure separates the user from the coordinates based on their proximity, the structure will act as a visual impediment just as it would if the digital content was a tangible print in our existing reality.

In the event the digital content does provide goods and services available for purchase, the purchase software 194 can facilitate the transfer of monetary funds in relation to a physical interaction of the user and the digital content in the digital airspace. The capabilities of the purchase software 194 are unlimited, but some embodiments communicate purchasing actions of a user, such as squeezing or rotating a digital icon within the digital airspace, across a network to begin processing of the purchased order, verification of funds, and logistics involved with order delivery. It is contemplated that the purchased material can be digital content that is immediately delivered in the form of modified aspects of the same physical location and digital airspace that was engaged to purchase the material, which can be effective with digital games and media accesses.

With the capability to recognize and log physical interaction of a user with portions of a digital airspace, metrics and analytics can be efficiently computed. The algorithm 196 can be used to accumulate data about the movements, interactions, and purchases with one or more digital airspaces to generate metrics like advertising effectiveness, coupon effectiveness, time viewing an advertisement, and number of users exposed to the advertisement. These metrics, which in no way are required or limiting to the capabilities of the advertising algorithm 196, can allow ineffective advertisements to be discovered quickly and the content of those advertisements to be modified, which can lead to optimized sales volume and generation of new business.

While an augmented reality device can be configured to allow a user to engage digital airspace tied to a physical location and purchase a good or service, the device may further be configured to facilitate the purchase of digital airspace itself. That is, the purchase software 194 of an augmented reality device can generate a price, confirm a sale, and secure a selected amount of digital airspace correlated to a particular longitude, latitude, altitude, and time in response to a user's interaction with a GUI of the device or existing digital content, such as in an auction style bidding competition. Such capabilities can allow a user to approach a physical location, see digital content in the digital airspace associated with that physical location, and engage the digital content to purchase the digital airspace for that physical location or digital airspace for a different physical location.

Figure 7:
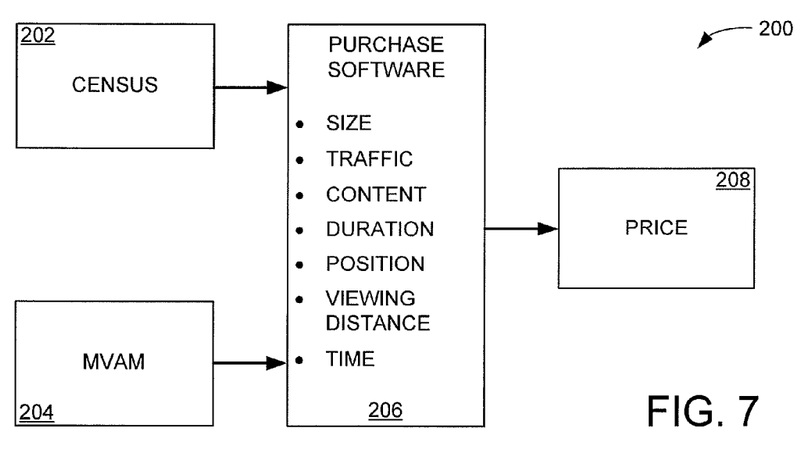
FIG. 7 shows a block representation of an example augmented reality purchasing logic utilized in accordance some embodiments.

FIG. 7 maps an example digital airspace purchasing logic 200 performed in accordance with assorted embodiments. The logic 200 can begin with a user query either from an in-person interaction with a digital airspace or from a remote location, such as an online platform like a website application or downloadable software on a desktop computer located distal to the digital airspace, for a particular longitude, latitude, altitude, and time that defines a physical location in which digital content can be present via the use of an augmented reality device.

Regardless of how a user query is made, control circuitry of an augmented reality device can poll any number of metrics pertaining to the physical location in question, such as census 202 and market value analytics methodology (MVAM) 204 data, that may provide information about the past number of sales, unique customers, advertising effectiveness, proximal population, and population age that is computed along with a variety of other informational metrics pertaining to the physical location in question in the purchase software 206 to attain a cost 208 of the digital airspace. The MVAM can be strategically developed to accurately track the incremental sales associated with specific advertisements, which can eliminate difficulties in advertising, such as high pricing and inaccurate evaluation.

The purchase software 206 can determine, for example, outdoor campaign effectiveness metrics (OCEM), which are measured by the number of steps completed in the 3-Step analytics acquisition process that begins by a user interacting with the augmented reality advertisement. When the user interacts with the augmented reality digital advertising content, they can be provided a generated coupon code that can be a numerical artifact within the digital content coding that links the coupon code to a specific digital content physical location that is pushed to notify third party purchasers of the digital airspace. The user can provide actual or representative engagement with the digital content, such as through pointing or throwing a ball, to initiate the analytics acquisition process by time stamping the interaction and recording the location of the augmented reality device at the current time.

While not limiting, various embodiments of the purchase software 206 compute a variety of OCEMs like opportunities to see (OTS), impression, gross rating points, cost per thousand impressions, net reach, average frequency, effective reach, effective frequency, share of voice, rich media display time, rich media interaction time, click through rate, average cost per click, average cost per order, unique viewers, and abandonment rate. These metrics can be used in isolation or together to form any number of ratios, such as impression being reach multiplied by frequency equals number of impressions, impression to interaction ratio, revenue per advertisement, cost per customer, MVAM process completion ratio, profit per advertisement, campaign effectiveness, location effectiveness, content effectiveness, time effectiveness, viewing device ratio, visitor demographics, airspace value, elapsed time from interaction to arrival, elapsed time from interaction to purchase, and elapsed time from arrival to purchase.

It should be noted that the factors that can be evaluated to render the digital airspace cost 208 is unlimited and the selected factors shown in FIG. 7 are mere exemplary in nature. As shown, the digital airspace data attained from the census 202 and MVAM 204 sources is correlated with a base price as well as other factors that may include at least the requested size of the digital airspace, the traffic density value of the physical location, the content to be shown, such as 2D or interactive video, duration of the purchase, time of day to be active, viewing distance, and position in relation to existing buildings and landmarks.

Specifically for traffic density, the purchase software 206 can use population density, measured traffic, and estimated traffic to compute an exposure potential. The exposure potential can subsequently undergo a visibility assessment where a 360° view from the digital airspace is measured for obstructions that can prevent content from being viewed. The computed exposure for the digital airspace in question can then be assessed a cost adjustment to accommodate higher, or lower, levels of visibility. With the ability to compute a number of different factors with varying complexity together to form a digital airspace price 208, the user is receiving a fair price that seeks to optimize supply and demand of digital airspace, especially for advertisements.

The digital airspace price 208 can consist of any number of unique coordinates that is determined by an algorithm that comprises any number of factors, such as static or dynamic images, traffic density value, campaign duration, run time, and viewing distance. The number of dimensions of displayed digital content may be computed with the content's programming difficulty and data usage to provide the digital airspace's price 208. In some embodiments, real and predicted traffic density is given a one-to-five value that categorizes a specific physical region, which may be proximal or distal from the physical location of the digital airspace, based on traffic and population density. It is noted that a physical location and corresponding digital airspace having a higher traffic density means the augmented reality digital content will receive more exposure.

As coordinates are purchased at the computed price 208, buyers have the ability to define the duration in which they would like to have rights to display their augmented reality digital content. Such duration can range from one day, one week, one month or one year. Buyers may also have the option to purchase exclusive rights to unique sets of coordinates, which can result in a higher price 208. In addition to the base price algorithm utilized by the purchase software 206, there are additional multipliers that can complete the pricing/purchasing methodology. For instance, the amount of viewing distance the digital content is viewable offers a third party the ability purchase an upgrade to a base price 208.

It is contemplated that a base price 208 corresponds, at least in part, on a visibility assessment takes a 360° panoramic image around a physical location where the augmented reality digital content is to be placed. The purchase software 206 can assess, out of the 360° image, how many degrees have obstructions that prevent the digital content from receiving optimal exposure. The number of total obstructed degrees can be compared to the total of 360° by the purchase software and then the ratio can be applied to the base price 208 as a discount. As such, the purchase software 206 can determine a base price 208 and subsequently apply discounts and multipliers to determine a final price.

Figure 8:
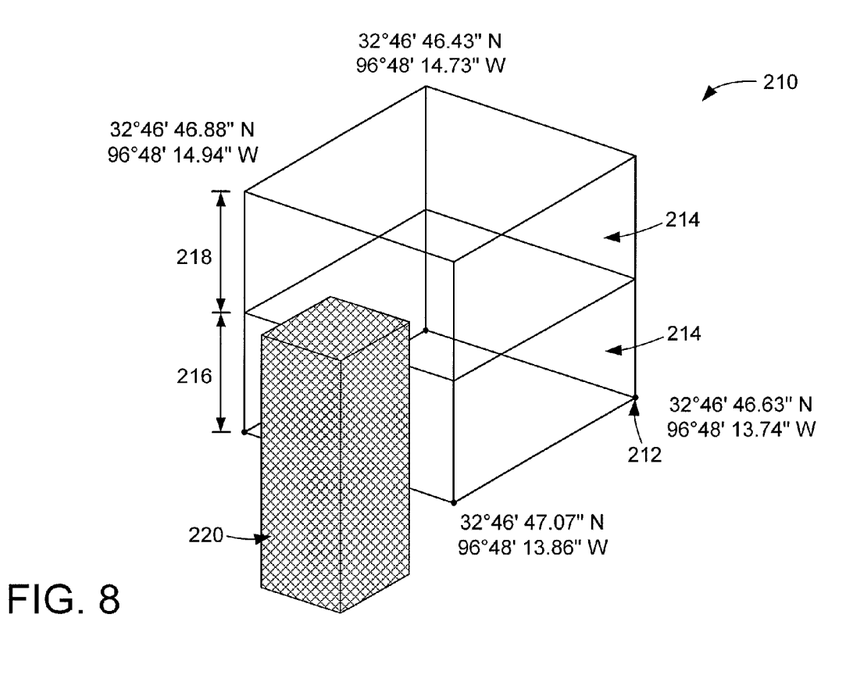
FIG. 8 conveys an isometric block representation of an example augmented reality digital airspace configured in accordance with various embodiments.

The ability to purchase certain times of day and different altitudes within a physical location can provide a digital airspace owner with a number of different content providing options catered to a variety of users. FIG. 8 generally illustrates an isometric block representation of an example digital airspace 210 that is tied to and continuously extends within the bounds 212 of a physical location defined by latitude, longitude, and altitude values. The example square digital airspace shape is possible, but not exclusive as any overall and boundary shape can be accommodated, such as a circle and combination of linear and curvilinear boundaries, to cater to nearly any physical location.

The purchased digital airspace 210 may be separated into multiple sub-sections 214 that continuously extend for less than all the volume within the airspace bounds 212. In the embodiment shown in FIG. 8, the digital airspace is divided into two elevations corresponding with different first 216 and second 218 altitudes. Such airspace division can correspond with different digital content to be published and concurrent interactions with the different sub-sections 214. For example, the lower elevation 196 can be configured with kids digital content conducive to children of a particular height while the higher elevation 218 contains digital content intended for adults with greater heights. With the ability to carve the digital airspace 210 into any number of sub-sections 214, the airspace owner can maximize the potential of information and advertisements by physically placing them where they will receive the most exposure to an intended consumer, such as kids.

As illustrated with reference to object 220, which can be a building, landmark, tree, hill, and other natural or artificial obstruction, and segmented portions of each sub-section 214, the digital content located behind the object 220 will not be shown to a user. That is, the augmented reality device and digital content producing server can aggregate public architectural and nature map data to create a digital mold of the area proximal the digital airspace 210 to prevent obstructed digital content from being visible when the object 220 is present between the user and digital airspace 210. The digital mold can further function as a barrier on any architecture and natural feature to determine if the user is indoors or outdoors. With the digital mold being 100% transparent and invisible to a naked human eye, but opaque from the perspective of technology and capable of operating seamlessly with the digital content, the augmented reality and actual reality appear to co-exist.

The ability to customize a purchased digital airspace can provide increased price efficiency for the cost of the digital airspace. The ability to recognize physical interaction of a user with the digital content of the digital airspace further allows an augmented reality device to maximize the efficiency of the digital content by logging user activity and adapting digital content to the logged activity. For instance, the recognition of a predetermined number of user interactions with digital content published within a particular digital airspace without a purchase can result in a predetermined alteration to the digital content, such as changing colors, available goods, and size of digital icons.

In other words, the visibility of augmented reality digital content being displayed within purchased coordinates has many contingencies in order to achieve optimal exposure. As a non-limiting example, digital content can be made visible to the user when the distance between the user and the content coordinates is 1,750 meters or less. At 1,750 meters the digital content being viewed will appear very small and as the distance between the user and the content decreases the size-to-distance ratio is positively affected until the content ultimately achieves the defined purchased size, which can alter the size, shape, and aspect ratio of the digital content.

Figure 9:
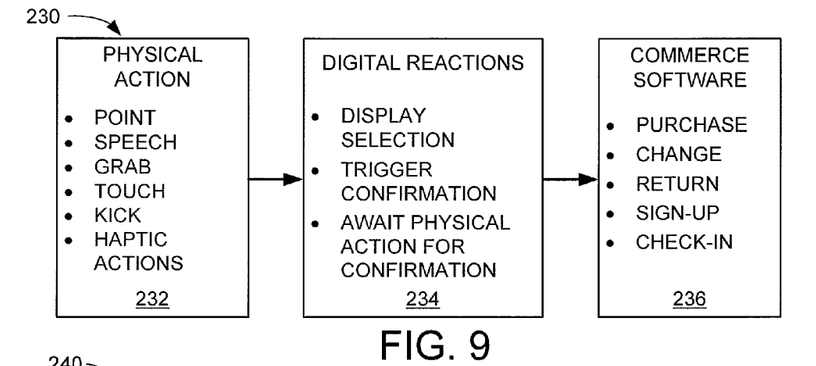
FIG. 9 depicts an example augmented reality device interaction logic that may be carried out in accordance with various embodiments.

FIG. 9 is an example recognition logic 230 that is performed in accordance with various embodiments to facilitate a diverse array of augmented reality device functions with respect to a purchased digital airspace. The logic 230 can begin with a physical action 232 from a user that can be any number of real-world movements by a user, such as, but not limited to, pointing, speaking, grabbing, touching, kicking, and executing a nod. Hence, any portion of a user's body can be used to conduct a physical action 232 to occupy empty physical space where digital content and digital airspace are assigned.

Without an augmented reality device capable of recognizing physical actions of a user, such as a heads-up display, a user would be merely gesturing and not actually controlling the device or digital content contained in the digital airspace. In contrast, the recognition circuitry and software of an augmented reality device configured in accordance with assorted embodiments allow such user actions 232 to control not only the digital content resident in the digital airspace but the augmented reality device itself. The recognition of user action and response of digital reaction 234 can manifest any number and kinds of results, such as the transformation of the digital content and triggering of confirmation. As a non-limiting example, a user could physically point at a physical location of digital airspace to select digital content and then grab the digital content with one or more fingers to confirm the selection before dragging the grabbed content to a predetermined area of the airspace to terminate the selection.

These exemplary actions 232 and digital reactions 234 can allow the digital content to be reactive and adaptive to a user's will. In various non-limiting situations, one or more digital reactions 234 are intended by a user to conduct a commercial purchase, which can be carried out at least by commerce software 236 resident in an augmented reality device. The commerce software 236 can correlate recognized physical actions 232 by one or more users that trigger at least one digital reaction 234 as a commercial intention that is carried out by the commerce software 236. While a commercial intention is not restricted to a particular commercial action, the users recognized actions can correspond with a purchase of goods and services, changing of an existing order or account setting, return of a previously purchased item, and updating a user's presence in the form of checking-in.

Assorted embodiments configure the commerce software 236 to contact third-party vendors and distributors over a network to secure monetary payment and delivery of a good and service to a user, such as through a digital or physical package delivery to a destination of the user's choice. The commerce software 236 is not restricted to monetary transactions as social and educational actions may also be facilitated. For example, recognition of a user's physical action 232, and the corresponding digital reactions 234, can engage in the posting of pictures and text to a social network as well as log in to an educational database like the Smithsonian to inform the user about landmarks and historical events in close proximity to the physical location corresponding to the digital airspace engaged by the user.

Figure 10A:
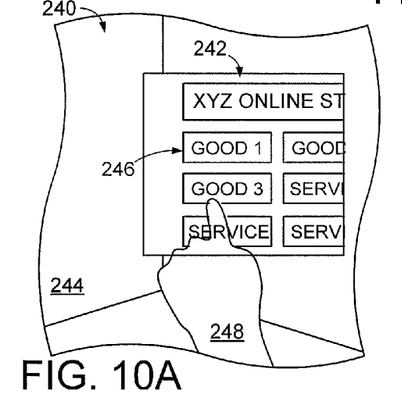
FIGS. 10A-10D respectively are perspective view block representations of an example augmented reality environment in accordance with some embodiments.

FIGS. 10A-10D respectively display front and side perspective block representations of an example augmented reality environment 240 in which an augmented reality device can be practiced in accordance with assorted embodiments. The front view of FIG. 10A shows an exemplary front view of the augmented reality environment 240 where a screen 242 of an augmented reality device is positioned within the field of vision of a user without obscuring the entirety of the user's view of the actual physical environment 244. With the capabilities of the augmented reality device discussed above, digital content 246 can be displayed on the screen 242 in association with digital airspace assigned to at least a latitude, longitude, altitude, and time to provide goods, services, information, media access, and alerts.

Figure 10B:
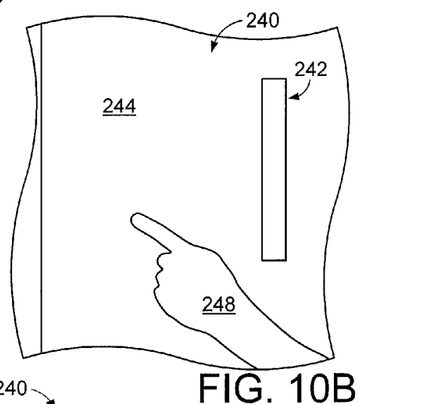

As shown in both FIGS. 10A and 10B, the appendage 248 of a user, which can be a fist, leg, foot, hip, and head without limitation, is extended into the digital airspace to engage the digital content 246. Through the engagement of the user's appendage 248, or another person's appendage with authorized access, the augmented reality device can recognize the physical action with one or more items assigned to predetermined locations within the digital airspace to initiate digital reactions, such as reactions 234 of FIG. 9. Attention to FIG. 10B further illustrates how the engagement of the digital content 246 does not happen in the actual physical environment 244, but instead is a combination of actual physical actions by the user and application of those actions into the augmented, digital reality by the augmented reality device, which is displayed via the screen 242.

Figure 10C:
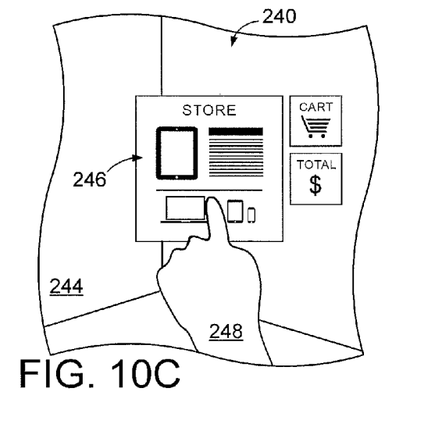

With the ability to display digital content nearly anywhere due to the capabilities of an augmented reality device, an entire world worth of digital content can be selectively assigned to physical locations that otherwise would not be practical to publish digital content, like remote wilderness locations or street surfaces. Such diverse content application capabilities can be particularly pertinent for advertising, especially with the user activity logging abilities of an augmented reality device. FIG. 10C displays another view of the digital content 246 when the user's field of vision is not restricted by the screen 242. That is, in the event the screen displaying the augmented reality digital content 246 is large enough to encompass a field of vision of the user, the digital content 246 can occupy as much, or as little, of the user's vision that corresponds with the user's physical position in relation to the digital airspace.

Figure 10D:
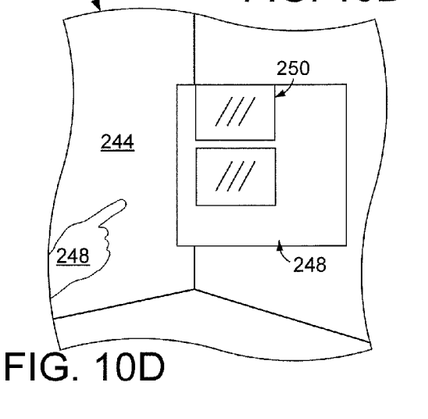

FIG. 10D further shows how the screen 242 is not limited to projecting digital content 246 as existing physical features, like windows 250, can be seen through the screen 242. As such, the screen 242 can be configured to be partially or completely transparent so that the physical features within and on the opposite side of the digital airspace from the user can be seen. As a non-limiting example, digital content 246 can be displayed between the user and the window 250 with a reduced opacity that allows the window 250 to be seen while the remaining digital content 246 not obstructing the window 250 is fully opaque.

Figure 11:
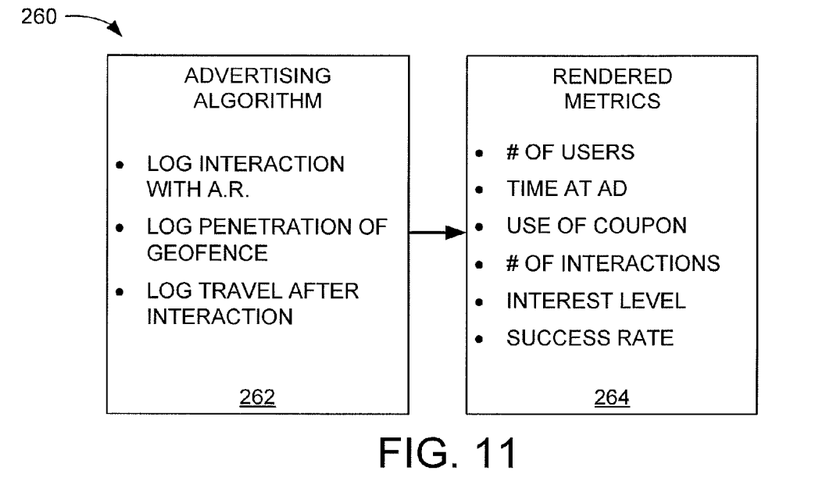
FIG. 11 displays an example advertising algorithm logic capable of being performed by an augmented reality device in assorted embodiments.

FIG. 11 provides a logical map of an example advertising methodology 260 that may be used with an augmented reality device and one or more users in some embodiments. The advertising methodology 260 can be stored and computed in a number of different remote and local locations that are accessed individually or concurrently over wired and wireless networks to apply an advertising algorithm 262 to render a variety of metrics 264.

The advertising algorithm 262 can be tuned to apply any number of actual, projected, and virtual data, such as MVAM data, to cater digital content to a user's real or estimated interests. The algorithm 262 may further utilize at least logged information from a user's interactions with an augmented reality, penetration of a geofence, and movement of the user after interacting with a digital airspace to compute the rendered metrics 264 that can be used to adapt digital content to the user. It should be noted that the advertising algorithm 262 is not limited to a single augmented reality device and can be configured to compile logged information from a plurality of augmented reality devices to compute the rendered metrics 264.

Use of the various data in the advertising algorithm 262 can provide at least the number of users accessing a certain digital airspace and general airspace region as well as the number of interactions resulting from those accesses. For purposes of this disclosure, a digital airspace access means the viewing of digital content with an augmented reality device while an interaction will herein be understood as the physical contact of an item in the digital airspace with a portion of the user's person. The knowledge of how many users view and subsequently interact with a digital airspace can be used to render a success rate of the digital content within the digital airspace, which may cause the digital content to change if a predetermined success rate threshold is not maintained.

The logging of the activity of a user, including time viewing a digital airspace, interacting with the airspace, and movement thereafter can render an interest level in the digital content of the digital airspace. Through the use of the interest level, digital content providers, sociologists, and behaviorists can determine a wide variety of advertising, social, economic, and regional data that can more accurately represent the people and quality of life around the digital airspace. For example, the use of coupons to purchase luxury items along with above average user interactions and viewing times can indicate strong economic stability and high levels of happiness in the user.

Figure 12:
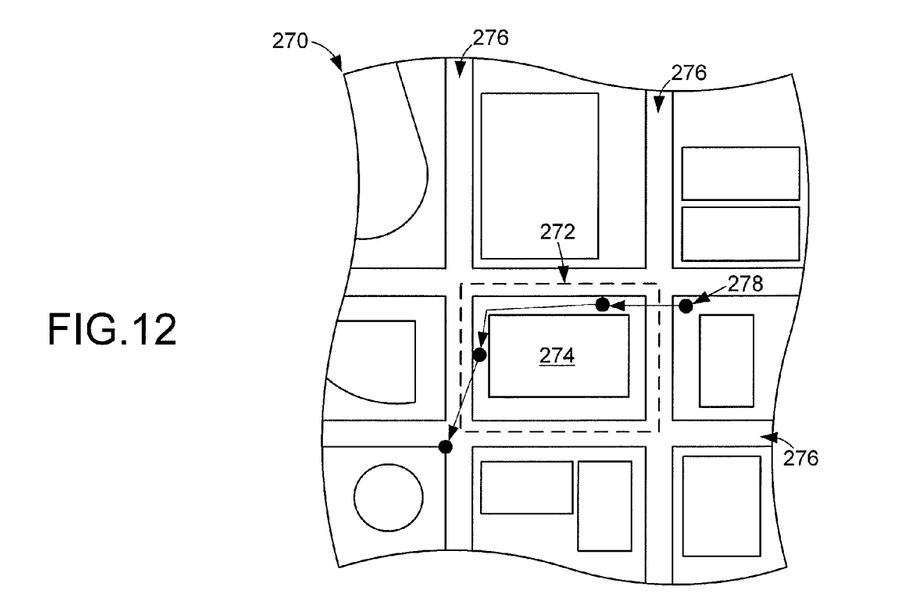
FIG. 12 is a top view block representation of an example augmented reality environment in which an augmented reality device can be employed.

Configuring an augmented reality device with user position and tracking capabilities can be useful in determining the effectiveness, appeal, strengths, and weaknesses of digital content assigned to a particular digital airspace. The use of a geofence can provide further resolution as to the manner in which digital content is received and interpreted by a user. FIG. 12 illustrates a top view block representation of an example augmented reality environment 270 configured in accordance with various embodiments to accurately render data that can be used by advertising algorithm to produce user and advertising metrics.

FIG. 12 shows an example geofence 272 that surrounds a selected building 274 where at least one physical location and corresponding digital airspace has been purchased and is displaying digital content. While the geofence 272 can be shaped to any dimensions and altitudes such as along a street 276, surrounding a building with a geofence 272 can allow a user's activity to be evaluated in relation to several digital airspaces locations displaying digital content of different sizes, types, products, and configurations. Through continuous, sporadic, and routine user position tracking by an augmented reality device in association with the geofence 272, an initial user position 278 can be logged from which the user traveled into the geofence 272.

The user tracking may continuously occur once the user in inside the geofence 272 and trigger a number of intricate calculations to be logged about the user's activities that otherwise would not be logged when the user is outside the geofence 272, such as higher resolution global position, walking gait, time stationary, time moving, rate of movement, user orientation, and digital content interactions with one or more digital airspaces. This type of user tracking can be logged and subsequently recalled to indicate where the user traveled, stopped, viewed digital content, and purchased items, which are all useful in determining the quality, success, and effectiveness of digital content.

The geofence 272 can further be utilized to initiate user prompting in relation to logged and estimated activities. For instance, entrance into the geofence 272 can trigger a coupon to appear on a user's augmented reality device that directs the user to digital content inside or outside the geofence 272 and renders advertising metrics about how the user responds to the coupon. In another non-limiting example, logged recent or distant activity within the geofence 272 by a user can result in digital content within the geofence 272 to adjust to actual or perceived tastes of the user. These exemplary geofence 272 related augmented reality device activities are not required, but illustrate the sophisticated capabilities associated with comprehensive tracking of user activity with a predetermined physical area.

The geofence 272 can be utilized by an augmented reality device to record the number of users that have interest in digital content displayed at a physical location. The number of interactions can then be compared to number impressions for that particular digital content, such as an advertisement. The ratio of interactions to impressions can represent the number of times an augmented reality device passed through the geofence 272 of the physical location displaying the augmented reality content compared to the number of augmented reality devices that interacted with the digital content within the geofence 272.

In the event a coupon is generated prior to a user crossing the geofence 272, the penetration of the geofence 272 can be time stamped to measure the time difference for a user to interact with the augmented reality digital content being advertised by the coupon compared to the time from the user's arrival at the location where the coupon directed the user. Such time stamp and ratio of interactions are not required or limiting, but are examples of how metrics can be computed and measurements can be taken by one or more augmented reality devices to provide third party digital airspace purchasers information about the effectiveness, exposure, and value of their augmented reality digital content.

For example, a augmented reality device may inform the third party of how many users are exposed to their digital content, how many of those users are interested, and how many users responded to the call to action by going to the physical location where the digital content was advertising. Use of a coupon by the user may further indicate the value of augmented reality digital content. The ability to monitor and measure various marketing and digital content metrics can allow a third party digital content purchaser to understand the effectiveness of not only an entire digital content campaign, but the effectiveness of a single advertisement and how many sales the content has been linked to.

In accordance with some embodiments, an augmented reality device can detect, measure, and compute indoor interaction metrics (TIM), such as the time an augmented reality device spends in particular areas of a store and also the number of consumer interactions with a particular physical location to which digital content is anchored. By having the ability to access to IIM, a store will be able to evaluate which areas of the store generate the most traffic and the most interactions compared to the rest of the store. The IIM may consist of one or more indoor customer engagement metrics (ICEM) that are unlimited in breadth and computation.

Assorted embodiments tune an augmented reality device to measure at least opportunities to see (OTS), impression, gross rating points, cost per thousand impressions, net reach, average frequency, effective reach, effective frequency, share of voice, rich media display time, rich media interaction time, click through rate, cost per click, cost per order, unique viewers, and abandonment rate for one or more digital airspace to calculate at least impression to interaction ratio, revenue per advertisement, cost per customer, MVAM process completion ratio, profit per advertisement, campaign effectiveness, location effectiveness, content effectiveness, time effectiveness, viewing device ratio, visitor demographics, airspace value, and average elapsed priority time.

With the ability to measure metrics and convey digital content in a physical location, an augmented reality device can serve as an interactive virtual kiosk for eCommerce based companies to have a physical and public store front at the fraction of the cost of renting or owning retail space. The augmented reality digital content can correspond with in purchased coordinates and will allow for a consumer to search the inventory, place wanted items into a cart, and check out. After completing one or more transactions via the augmented reality device, the online retailer would ship the products as they would if the user purchased items online.

It is contemplated that the geofence 272 may be partially or completely indoors. Such indoor location can pose difficulties for accurate global positioning as signals can lose precision due to a roof or overhead structure. Accordingly, various embodiment can utilize an indoor triangulation, such as Bluetooth trilateration, to accurately reinforce a global positioning signal for the augmented reality device. Such indoor triangulation means can be used when the augmented reality device is sensed to be indoor and can utilize one or more beacons to assign geospatial coordinates that complement the accurate placement and display of digital content at a predetermined physical location.

Figure 13:
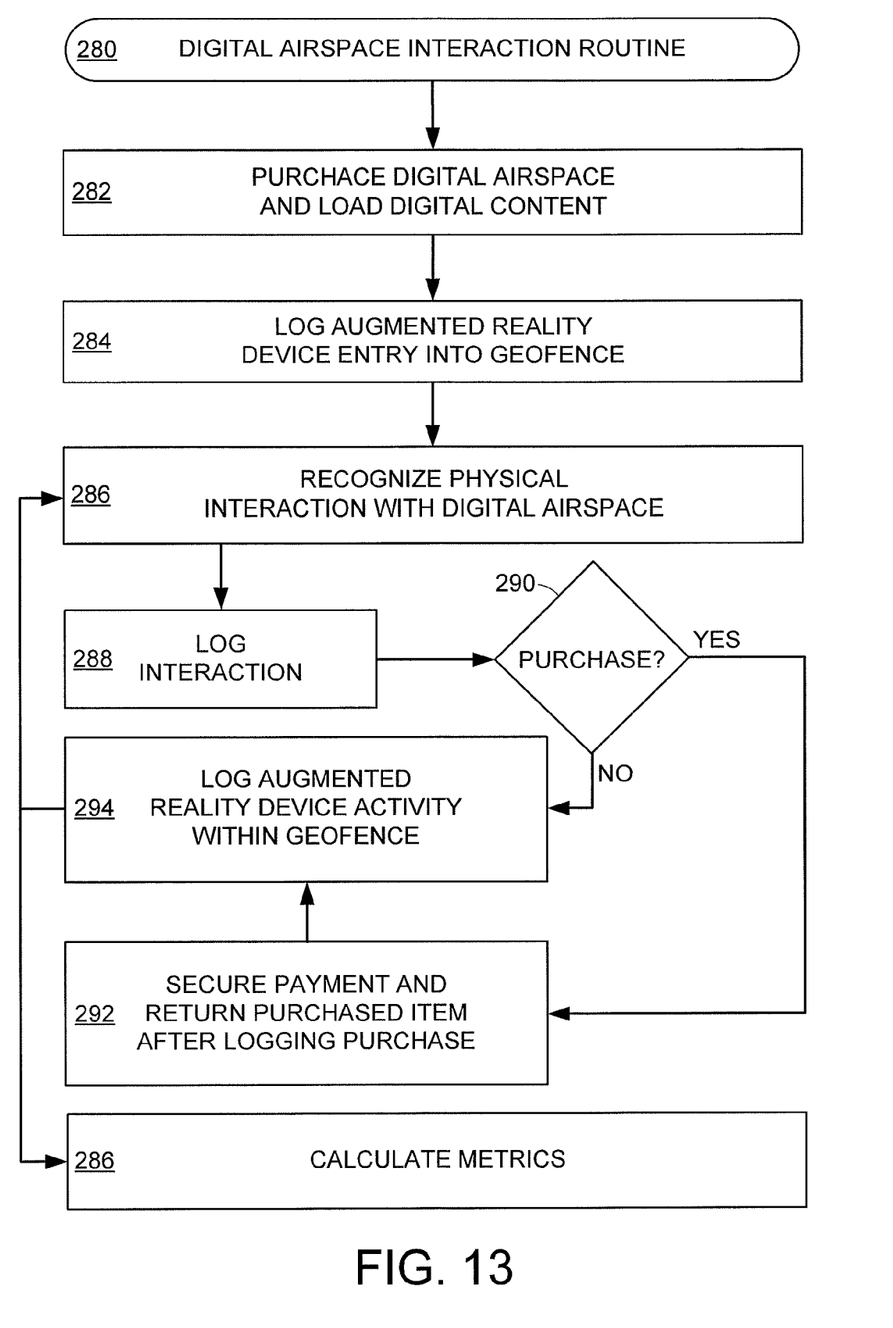
FIG. 13 is a flowchart of an example augmented reality interaction routine that may be carried out in accordance with various embodiments.

Although interaction of a user with digital content assigned to a particular physical location and digital airspace is unlimited, FIG. 13 provides an example digital airspace interaction routine 280 that is carried out with at least one augmented reality device in accordance with various embodiments. Initially, the routine 280 has digital airspace corresponding to a particular physical location being purchased in step 282 and subsequently loaded with digital content specific to the purchaser. As discussed above, the augmented reality device itself or a remote access site can be used to purchase the digital airspace and load digital content, without limitation.

The loading of digital content into the digital airspace can result in some or all augmented reality devices to be updated with data corresponding to the presence of digital content in the assigned physical location. The purchaser of the digital airspace may further purchase heightened advertising data to be logged for user activity by buying a geofence region to be place around the digital airspace. In such an event, step 284 can subsequently log one or more augmented reality devices entrance into the purchased geofence. Entrance of the augmented reality device into the geofence can further trigger, such as with a push notification to a user's mobile computing device, the recognition of physical interactions with some or all of the digital content within the geofence in step 286 and logging of those interactions in step 288.

The logged user activity from step 288 can be used passively to render advertising metrics and actively to produce coupons and change digital content configurations to optimize the appeal and success changes of the digital content. Assorted embodiments can use the logged interactions to change the digital airspace in which digital content is displayed, which would correspond with step 282 purchasing more than one separate digital airspaces. The tracking and logging of user activity in step 286 and 288 can continue while decision 290 continually or routinely evaluates if a purchase has been made via the logged interactions.

If a purchase has been made, the terms of the purchase are passively sent to the advertising algorithm to render metrics while step 292 actively secures payment of the purchased item and plots purchase logistics that may involve the shipping of a package. At the conclusion of step 292 or in the event no purchase is made from decision 290, the activity of the augmented reality device is logged while within the geofence in step 294. The logging of user activity may progress and continue even if the user exits the geofence, but is continually logged in various embodiments that include step 294. During or after the logging of user activity in step 294, the routine 290 can return to step 286 to log physical interactions with digital content as well as send logged data to be processed to render advertising metrics that can be used to monitor the condition and quality of digital content within the geofence.

Through the various aspects of routine 280, digital airspace corresponding to a physical location can be populated with digital content that is subsequently evaluated with reference to at least one user's activity that is tracked and logged by an augmented reality device providing the user with access to the digital content. Although the steps and decision of routine 280 correspond to some embodiments, the content of the routine 280 is not required or limiting as any portion can be removed and changed just as any subject matter can be added. For example, a step may be added that specifically logs the time which a user spends within and the locations outside the geofence which the user travels immediately before and after encountering the geofence.

In view of the present disclosure, it can be appreciated that an augmented reality device can be configured to provide sophisticated access to digital content assigned to a particular physical location. The ability to convey and interact with digital content in a nearly unlimited variety of shapes, sizes, colors, and constituent items allows media, commerce, and education to be facilitated without occupying physical space with visual conveyances like billboards, video boards, and kiosks. Moreover, the monitoring of user activity both in the physical world and augmented reality allows digital content to be optimized through advertising metrics rendered from logged user activity. As such, an augmented reality device can provide access to digital content that is continually adapting to a user's interests to provide the most efficient conveyance of information and advertising possible.

With an augmented reality device configured in accordance with various embodiments, a diverse assortment of metrics can be measured and computed that are similar to those currently used and standard to existing online marketing practices. Such metrics may consist, but are not limited to: visits, unique visitors, average page views/visits, average time on store, bounce rate, percent of new visits and conversions. In addition to the standard metrics, the augmented reality device can measure and compute outdoor interaction campaign effectiveness metrics (OCEM) and indoor interaction metrics (IIM) that may respectively consist of: interaction to impression ratio and evaluations of traffic and interaction generators.

It is to be understood that even though numerous characteristics and configurations of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. A system comprising an augmented reality device comprising a controller, memory, and at least one screen, the augmented reality device configured to: allow a first user to purchase rights to a digital airspace correlated to and in the proximity of a real-world physical location, the digital airspace having a volume defined by at least four unique coordinates, each unique coordinate having a longitude, a latitude, and an altitude, the rights comprising posting augmented reality digital content in the digital airspace, the digital airspace priced in accordance with a visibility assessment that takes a 360 degree panoramic image around the real-world physical location where the augmented reality digital content is to be placed; establish a real-world physical location being viewed by a second user using the augmented reality device; establish a live digital airspace correlated to and in the proximity of some, or all, of the real-world physical location of the second user; establish an augmented reality digital content to be shown in the live digital airspace, wherein the augmented reality digital content is specified by the first user who purchases the right to the said digital airspace; and present the augmented reality digital content in the live digital airspace on the screen to the second user when the at least one screen is positioned between the second user and the physical location and the second user is oriented towards the physical location.

2. The system of claim 1, wherein the augmented reality device is worn by the users.

3. The system of claim 1, wherein first and second screens are respectively adapted to display different augmented reality digital content.

4. The system of claim 1, wherein the digital airspace is divided into multiple sub-sections positioned at different altitudes and displaying different augmented reality digital content.

5. The system of claim 1, wherein the augmented reality device maintains the augmented reality digital content at the physical location regardless of the position and orientation of the user.

6. The augmented reality system of claim 1, wherein the controller is configured to generate a price for a selected volume of digital airspace.

7. An apparatus comprising an augmented reality device comprising a controller, memory, at least one network adapter, and at least one screen, the augmented reality device configured to: be wirelessly mobile via the at least one network adapter connected to the controller allow a first user to purchase rights to a digital airspace correlated to and in the proximity of a real-world physical location, the digital airspace having a volume defined by at least four unique coordinates, each unique coordinate having a longitude, a latitude, and an altitude, the rights comprising posting augmented reality digital content in the digital airspace, the digital airspace priced in accordance with a visibility assessment that takes a 360 degree panoramic image around the real-world physical location where the augmented reality digital content is to be placed; establish a real-world physical location being viewed by a second user using the augmented reality device; establish a live digital airspace correlated to and in the proximity of some, or all, of the real-world physical location of the second user; establish an augmented reality digital content to be shown in the live digital airspace, wherein the augmented reality digital content is specified by the first user who purchases the right to the said digital airspace; and present the augmented reality digital content in the live digital airspace on the screen to the second user when the at least one screen is positioned between the second user and the physical location and the second user is oriented towards the physical location.

8. The apparatus of claim 7, wherein the controller and the at least one network adapter provides a global position of the augmented reality device, the global position consisting of latitude, longitude, and altitude.

9. The apparatus of claim 7, wherein the at least one network adapter connects the augmented reality device to at least one remote server, the server providing the augmented reality digital content to the augmented reality device.

10. The apparatus of claim 7, wherein the augmented reality digital content comprises a two dimensional image.

11. The apparatus of claim 7, wherein the augmented reality digital content comprises a three dimensional image.

12. The apparatus of claim 7, wherein the augmented reality digital content comprises a video.

13. The apparatus of claim 7, wherein the augmented reality digital content is invisible to the naked eye.

14. The apparatus of claim 7, wherein the controller is configured to generate a price for a selected volume of digital airspace.

15. An augmented reality device comprising a controller, memory, a sensor, and at least one screen, the augmented reality device configured to: allow a first user to purchase rights to a digital airspace correlated to and in the proximity of a real-world physical location, the digital airspace having a volume defined by at least four unique coordinates, each unique coordinate having a longitude, a latitude, and an altitude, the rights comprising posting augmented reality digital content in the digital airspace, the digital airspace priced in accordance with a visibility assessment that takes a 360 degree panoramic image around the real-world physical location where the augmented reality digital content is to be placed, the purchase conducted in reponse to a user engagement recognized by the sensor; establish a real-world physical location being viewed by a second user using the augmented reality device; establish a live digital airspace correlated to and in the proximity of some, or all, of the real-world physical location of the second user; establish an augmented reality digital content to be shown in the live digital airspace, wherein the augmented reality digital content is specified by the first user who purchases the right to the said digital airspace; and present the augmented reality digital content in the live digital airspace on the screen to the second user when the at least one screen is positioned between the second user and the physical location and the second user is oriented towards the physical location.

16. The augmented reality device of claim 15, wherein the user engagement is recognized by multiple different sensors.

17. The augmented reality device of claim 15, wherein the controller correlates the user engagement with articulation of the augmented reality digital content.

18. The augmented reality device of claim 15, wherein the controller correlates the user engagement with modification of the augmented reality digital content.

19. The augmented reality device of claim 15, wherein the controller correlates the user engagement with purchasing of a good or service.

20. The augmented reality device of claim 15, wherein the controller is configured to differentiate between pointing, selecting, and rotating user engagements with the augmented reality digital content.

21. The augmented reality device of claim 15, wherein the controller is configured to generate a price for a selected volume of digital airspace.

* * * * *

UNITED STATES PATENT AND TRADEMARK OFFICE
CERTIFICATE OF CORRECTION

PATENT NO.       : 9,390,563 B2
APPLICATION NO.  : 14/457312
DATED            : July 12, 2016
INVENTOR(S)      : Kevin J. Hart It is certified that error appears in the above-identified patent and that said Letters Patent is hereby corrected as shown below:

On the title page item (73) Assignee: please delete "AIR VIRTISE LLC" and replace with --AIRVIRTISE LLC--

In the claims:

Column 18, line 18, claim 15, please delete "reponse" and replace with --response--

Signed and Sealed this
Thirtieth Day of August, 2016

Michelle K. Lee
*Director of the United States Patent and Trademark Office*